United States Patent
Tan

(10) Patent No.: US 10,039,114 B2
(45) Date of Patent: Jul. 31, 2018

(54) RADIO ACCESS NETWORK FOR UNMANNED AERIAL VEHICLES

(71) Applicant: Verizon Patent and Licensing Inc., Arlington, VA (US)

(72) Inventor: Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 14/685,887

(22) Filed: Apr. 14, 2015

(65) Prior Publication Data

US 2016/0330771 A1   Nov. 10, 2016

(51) Int. Cl.
*H04W 72/08* (2009.01)
*H04B 7/185* (2006.01)
*H04W 16/14* (2009.01)
*H04W 84/00* (2009.01)

(52) U.S. Cl.
CPC ........ *H04W 72/08* (2013.01); *H04B 7/18506* (2013.01); *H04W 16/14* (2013.01); *H04W 84/005* (2013.01)

(58) Field of Classification Search
CPC . H04W 16/14; H04W 72/0453; H04W 72/08; B64C 39/02; B64D 47/06; H04B 7/18508
See application file for complete search history.

(56) References Cited

U.S. PATENT DOCUMENTS

| | | | | |
|---|---|---|---|---|
| 7,720,481 | B2* | 5/2010 | Gallagher | H04M 3/42246 370/331 |
| 9,467,922 | B1* | 10/2016 | Buchmueller | H04W 36/32 |
| 2013/0044611 | A1* | 2/2013 | Jalali | H04B 7/18508 370/252 |
| 2014/0066074 | A1* | 3/2014 | Folke | H04W 36/08 455/437 |
| 2015/0230150 | A1* | 8/2015 | Wang | H04B 7/18506 370/252 |
| 2015/0236781 | A1* | 8/2015 | Jalali | H04W 84/06 370/252 |
| 2016/0012730 | A1* | 1/2016 | Jarrell | G08G 5/0069 701/8 |
| 2016/0099769 | A1* | 4/2016 | Moffatt | H04B 7/1555 455/431 |

(Continued)

OTHER PUBLICATIONS

Dalamagkidis, et al. On Integrating Unmanned Aircraft Systems in to the National Airspace System. 2nd Edition Springer 2012.*

(Continued)

*Primary Examiner* — Jeffrey M Rutkowski
*Assistant Examiner* — Basil Ma

(57) ABSTRACT

A device may determine an elevation of an unmanned aerial vehicle, or may determine multiple signal strengths corresponding to multiple communications between the unmanned aerial vehicle and multiple base stations. The multiple communications may be transmitted via one or more frequency bands. The device may identify, based on the elevation or the plurality of signal strengths, a frequency band, of the one or more frequency bands, via which unmanned aerial vehicle is to communicate. The device may establish a connection between the unmanned aerial vehicle and a base station, of the multiple base stations, using the frequency band.

20 Claims, 11 Drawing Sheets

(56) References Cited

U.S. PATENT DOCUMENTS

| | | | | |
|---|---|---|---|---|
| 2016/0191176 A1* | 6/2016 | O'Keeffe | ............... | H01Q 3/267 |
| | | | | 455/63.4 |
| 2016/0227460 A1* | 8/2016 | Hyslop | ................... | H04W 4/02 |
| 2016/0300492 A1* | 10/2016 | Pasko | ..................... | G08G 5/003 |
| 2016/0300493 A1* | 10/2016 | Ubhi | ..................... | G05D 1/0011 |
| 2017/0171761 A1* | 6/2017 | Guvenc | ................... | H04W 4/90 |

OTHER PUBLICATIONS

Song et al. "Investigation on Elevation Beamforming for Future LTE-Advanced" IEEE ICC'13. 2013.*
3GPP, "The Evolved Packet Core," http://www.3gpp.org/technologies/keywords-acronyms/100-the-evolved-packet-core, Mar. 6, 2012, 3 pages.
Wikipedia, "Advanced Wireless Services," http://en.wikipedia.org/wiki/Advanced_Wireless_Services, Mar. 16, 2015, 5 pages.
Wikipedia, "E-UTRA," http://en.wikipedia.org/wiki/E-UTRA#Frequency_bands_and_channel_bandwidths, Apr. 7, 2015, 10 pages.
Phone Scoop, "A Visual Guide to AWS," http://www.phonescoop.com/articles/article.php?a=99&p=1493, Oct. 17, 2006, 6 pages.
Phone Scoop, "AWS," http://www.phonescoop.com/glossary/term.php?gid=324, Jul. 12, 2012, 2 pages.

* cited by examiner

US 10,039,114 B2

RADIO ACCESS NETWORK FOR UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of applications, such as police surveillance, firefighting, security work (e.g., surveillance of property), commercial purposes, etc.

DETAILED DESCRIPTION OF PREFERRED EMBODIMENTS

The following detailed description of example implementations refers to the accompanying drawings. The same reference numbers in different drawings may identify the same or similar elements.

An unmanned aerial vehicle (UAV) may be controlled using radio waves transmitted from a transmitter that is separate from the UAV (e.g., controlled by an operator on the ground) to a receiver on the UAV. Thus, control of the UAV may be limited to a coverage area based on the transmission power of the radio waves, terrain that limits the coverage area, a line of sight between the transmitter and the receiver, or the like. Some UAV applications may require the UAV to travel long distances that are outside the coverage area of a single transmitter, such as for delivery of lightweight commercial products (e.g., packages), food, medicine, or the like. Implementations described herein utilize a radio access network, such as a long term evolution (LTE) network, to permit UAVs to be reliably controlled over long distances.

Figure 1A:
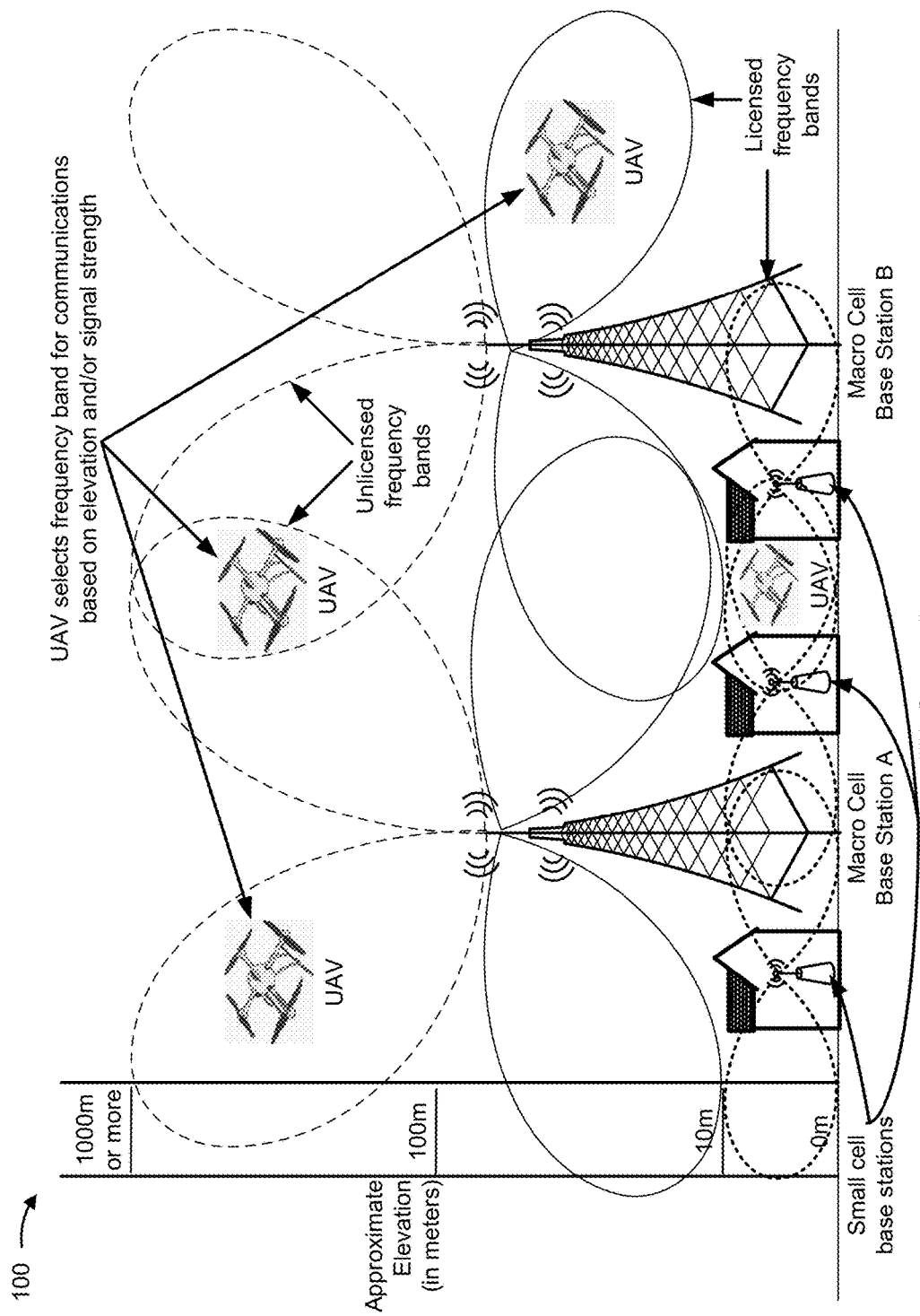
FIGS. 1A and 1B are diagrams of an overview of an example implementation described herein.
Figure 1B:
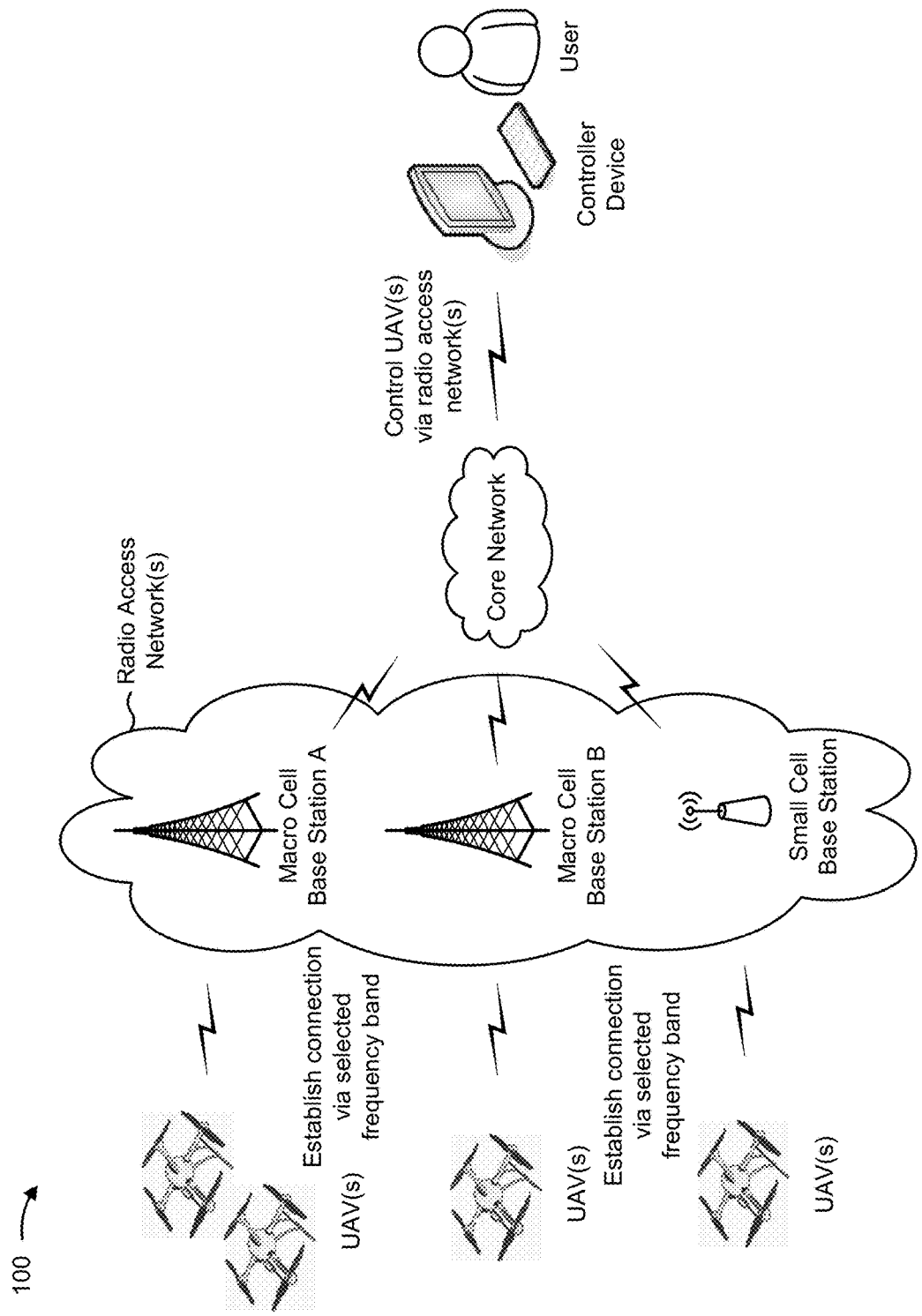

FIGS. 1A and 1B are diagrams of an overview of an example implementation 100 described herein. As shown in FIG. 1A, unmanned aerial vehicles (UAVs) may use base stations to connect to a network via which the UAVs are controlled. For example, and as shown, a UAV may connect to the network via a macro cell base station, a small cell base station, or another type of base station. The base station may be associated with a radio access network, such as an LTE network or another type of radio access network. Thus, the UAV may maintain communication with the network, as the UAV travels over long distances, by establishing communications with different base stations as the UAV moves (e.g., using a handover procedure).

As further shown, a UAV may communicate with a base station using a licensed frequency band and/or an unlicensed frequency band. For example, a base station may be configured to operate using a licensed frequency band for terrestrial communications (e.g., communications with devices located below a threshold elevation), and may be configured to operate using an unlicensed frequency band for aerial communications (e.g., communications with devices located above a threshold elevation). A UAV may communicate with a base station using a licensed frequency band or an unlicensed frequency band, depending on an elevation of the UAV and/or a signal strength between the UAV and the base station (e.g., signal strengths on different frequency bands). As an example, and as shown, the UAV may select a frequency band for communications based on an elevation of the UAV and/or a signal strength between the UAV and a base station on a frequency band, as described in more detail elsewhere herein.

As shown in FIG. 1B, a UAV may establish a connection with a base station via the selected frequency band. As further shown, the UAVs may communicate with a controller device, used to control the UAVs, via a radio access network associated with one or more base stations. For example, communications between the UAVs and the controller device may traverse a base station, a core network (e.g., an evolved packet core), and/or one or more other networks, as described in more detail elsewhere herein. In this way, a UAV may maintain a reliable connection with a controller device using the radio access network, thereby permitting a user to control the UAVs as the UAVs traverse long distances. In some cases, a UAV may communicate using an unlicensed frequency band for aerial communications, thereby reducing interference with communications of other devices, and reducing costs, as described in more detail elsewhere herein.

Figure 2:
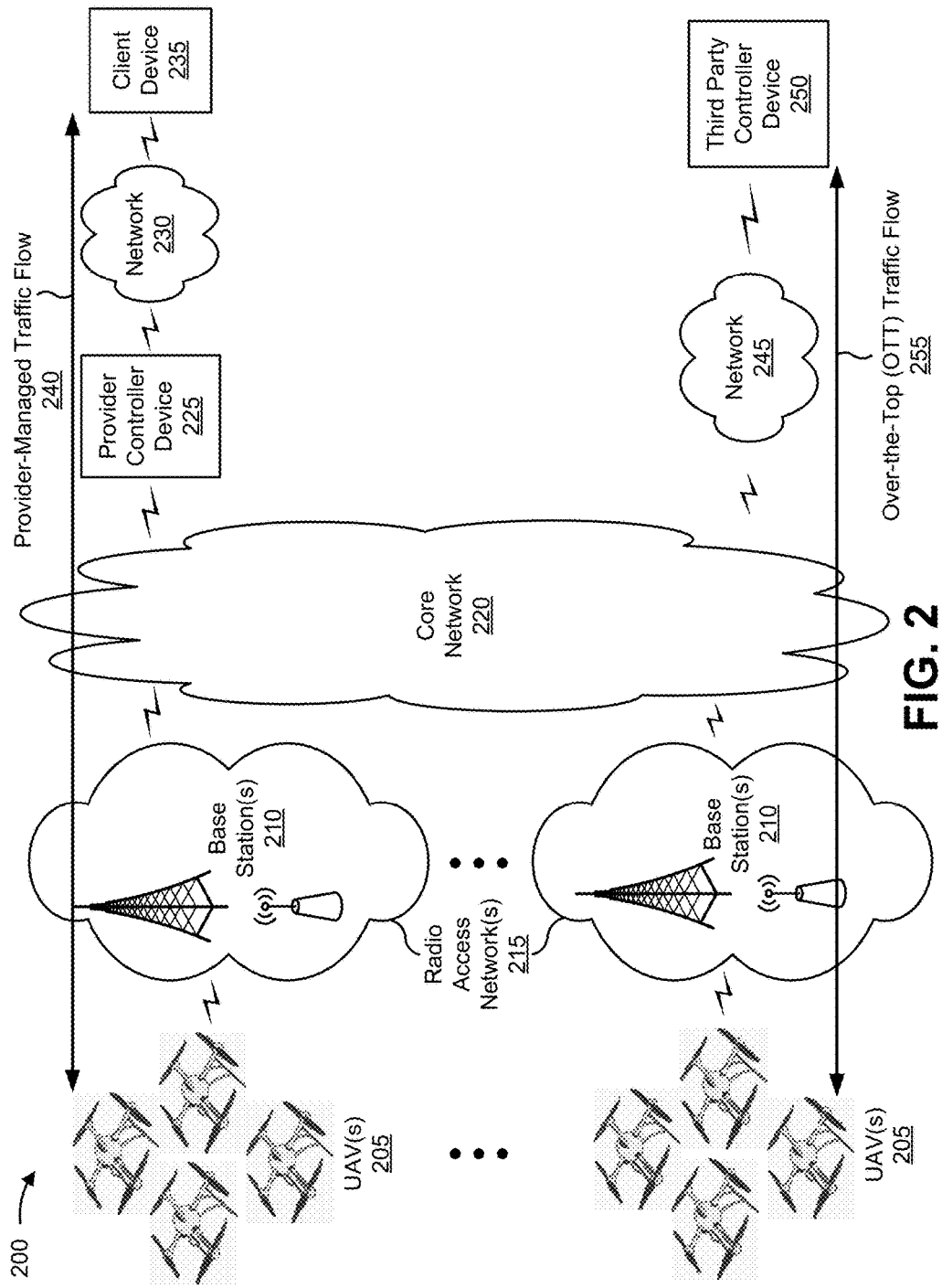
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more UAVs 205 (hereinafter referred to individually as "UAV 205," and collectively as "UAVs 205"), one or more base stations 210 (hereinafter referred to individually as "base station 210," and collectively as "base stations 210"), one or more radio access networks (RANs) 215 (hereinafter referred to individually as "RAN 215," and collectively as "RANs 215"), a core network 220, a provider controller device 225, a network 230, a client device 235, a provider-managed traffic flow 240, a network 245, a third party controller device 250, and an over-the-top (OTT) traffic flow 255. Devices of environment 200 may interconnect via wired connections, wireless connections, or a combination of wired and wireless connections.

UAV 205 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). UAV 205 may have a variety of shapes, sizes, configurations, characteristics, etc. for a variety of purposes and applications. In some implementations, UAV 205 may include one or more sensors, such as an electromagnetic spectrum sensor (e.g., visual spectrum, infrared, or near infrared cameras, radar systems, etc.), a biological sensor, a temperature sensor, a chemical sensor, or the like. In some implementations, UAV 205 may include one or more components for communicating with base station(s) 210. Additionally, or alternatively, UAV 205 may transmit UAV information to and/or may receive control information from a controller device, such as provider controller device 225 and/or third party controller device 250. The UAV information and/or the control information may be communicated via base station 210 and/or core network 220.

Base station 210 may include one or more devices capable of transferring traffic, such as audio, video, text, and/or other traffic, destined for and/or received from UAV 205. In some implementations, base station 210 may include an evolved NodeB (eNB) associated with an LTE radio access network (RAN) that receives traffic from and/or sends traffic to provider controller device 225 and/or network 245 via core network 220. Additionally, or alternatively, one or more base stations 210 may be associated with a RAN that is not associated with the LTE network. Base station 210 may send traffic to and/or receive traffic from UAV 205 via an air interface.

Base station(s) 210 may include different types of base stations, such as a macro cell base station or a small cell base station, such as a micro cell base station, a pico cell base station, and/or a femto cell base station. A macro cell base station may cover a relatively large geographic area (e.g., several kilometers in radius). A small cell base station may be a lower-powered base station, as compared with a macro cell base station that may operate in the same or different (e.g., licensed, unlicensed, etc.) frequency bands as macro cell base stations.

In some implementations, base station 210 may be capable of communicating with UAV 205 using different radio frequency (RF) bands. For example, base station 210 and UAV 205 may communicate via a licensed frequency band (e.g., a licensed radio frequency spectrum band) and/or an unlicensed frequency band (e.g., an unlicensed radio frequency spectrum band). A licensed frequency band may include one or more bands of RF spectrum that are licensed for use by a particular provider. An unlicensed frequency band may include on or more bands of RF spectrum that are not licensed for use by a particular provider, and that are open to use by any user. Thus, the unlicensed frequency band may be shared by base stations 210, UAVs 205, and one or more other devices.

As an example, the unlicensed frequency band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some aspects, the unlicensed frequency band may include one or more RF spectrum bands that are open for shared use by any device that complies with regulatory agency rules (e.g., associated with a particular country) for communicating via the one or more RF spectrum bands. For example, the unlicensed frequency band may include one or more radio frequencies between approximately 5 GHz and approximately 6 GHz. As a more specific example, the unlicensed frequency band may include one or more radio frequencies between approximately 5.15 GHz and approximately 5.825 GHz.

In some implementations, a macro cell base station may use different frequency band(s) than a small cell base station. For example, a macro cell base station may use an unlicensed frequency band (e.g., in the range of approximately 5 GHz to 6 GHz) for aerial communications (e.g., for communications of devices with elevations in the range of approximately 100 meters to approximately 1000 meters), and may use a licensed frequency band (e.g., in the range of approximately 700 megahertz (MHz) to approximately 800 MHz) for terrestrial communications (e.g., for communications of devices with elevations in the range of approximately 10 meters to approximately 100 meters). As another example, a small cell base station may use a licensed frequency band, such as an advanced wireless services (AWS) band (e.g., in the range of approximately 1710-1755 MHz and/or 2110-2155 MHz) for terrestrial communications (e.g., for communications of devices with elevations in the range of approximately 1 meter to approximately 10 meters).

RAN 215 may include one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., an LTE RAN, an LTE-Advanced (LTE-A) RAN, an LTE-unlicensed (LTE-U) RAN, etc.), or the like. RAN 215 may include one or more base stations 210, and UAVs 205 may access core network 220 via RAN 215 and base station(s) 210.

Core network 220 may include a network that enables communications between RAN 215 (e.g., base station(s) 210) and one or more devices and/or networks connected to core network 220. For example, core network 220 may include an evolved packet core (EPC). Core network 220 may include one or more mobility management entities (MMEs), one or more serving gateways (SGWs), and one or more packet data network gateways (PGWs) that together provide mobility functions for UAVs 205 and enable UAVs 205 to communicate with provider controller device 225 and/or network 245.

Provider controller device 225 may include one or more devices for receiving UAV information from UAV(s) 205 and/or providing control information to UAV(s) 205. For example, provider controller device 225 may include a server, a desktop computer, a laptop computer, or a similar device. In some implementations, provider controller device 225 may reside within core network 220, and may permit control of UAV(s) 205 by a user who interacts with client device 235 to access provider controller device 225. In some implementations, provider controller device 225 may be included in a data center, a cloud computing environment, a server farm, or the like, which may include multiple provider controller devices 225.

Network 230 may include one or more wired and/or wireless networks that permit communication between provider controller device 225 and client device 235. For example, network 230 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. In some implementations, network 230 may include a private network (e.g., a virtual private network (VPN)) that permits remote access to provider controller device 225 by client device 235 (e.g., to control UAV(s) 205).

Client device 235 may include one or more devices capable of receiving UAV information from UAV(s) 205 and/or providing control information to UAV(s) 205 (e.g., via provider controller device 225). For example, client device 235 may include a desktop computer, a laptop computer, a tablet computer, a mobile phone, or a similar device. In some implementations, a user may interact with client device 235 to access provider controller device 225 (e.g., via a VPN, a remote desktop application, an application programming interface, etc.) to receive UAV information from UAV(s) 205 and/or to provide control information for controlling UAV(s) 205.

Provider-managed traffic flow 240 may include a path for communications between UAV(s) 205 and client device 235. For example, communications between UAV(s) 205 and client device 235 may traverse RAN 215 (e.g., via one or more base stations 210), core network 220 (e.g., via an SGW and a PGW, not shown), provider controller device 225, and network 230, which may provide client device 235 with access to provider controller device 225. In this way, a network operator, associated with core network 220, may permit third parties to access and control UAV(s) 205 via provider controller device 225, which may be owned and operated by the network operator.

Network 245 may include one or more wired and/or wireless networks that permit communication between core network 220 and third party controller device 250. For example, network 245 may include a cellular network, a PLMN, a wireless local area network, a LAN, a WAN, a MAN, a telephone network, a private network, an ad hoc network, an intranet, the Internet, a fiber optic-based network, a cloud computing network, and/or a combination of these or other types of networks. In some implementations, network 245 may permit third party controller device 250 to access and/or control UAV(s) 205.

Third party controller device 250 may include one or more devices capable of receiving UAV information from UAV(s) 205 and/or providing control information to UAV(s) 205. For example, third party controller device 250 may include a desktop computer, a laptop computer, a tablet computer, a mobile phone, a server, or a similar device. In some implementations, a user may interact with third party controller device 250 to receive UAV information from UAV(s) 205 and/or to provide control information for controlling UAV(s) 205.

OTT traffic flow 255 may include a path for communications between UAV(s) 205 and third party controller device 250. For example, communications between UAV(s) 205 and third party controller device 250 may traverse RAN 215 (e.g., via one or more base stations 210), core network 220 (e.g., via an SGW and a PGW, not shown), and network 245, which may permit communication between core network 220 and third party controller device 250. In this way, a network operator, associated with core network 220, may permit over-the-top access and control of UAV(s) 205 by third parties, without using provider controller device 225.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
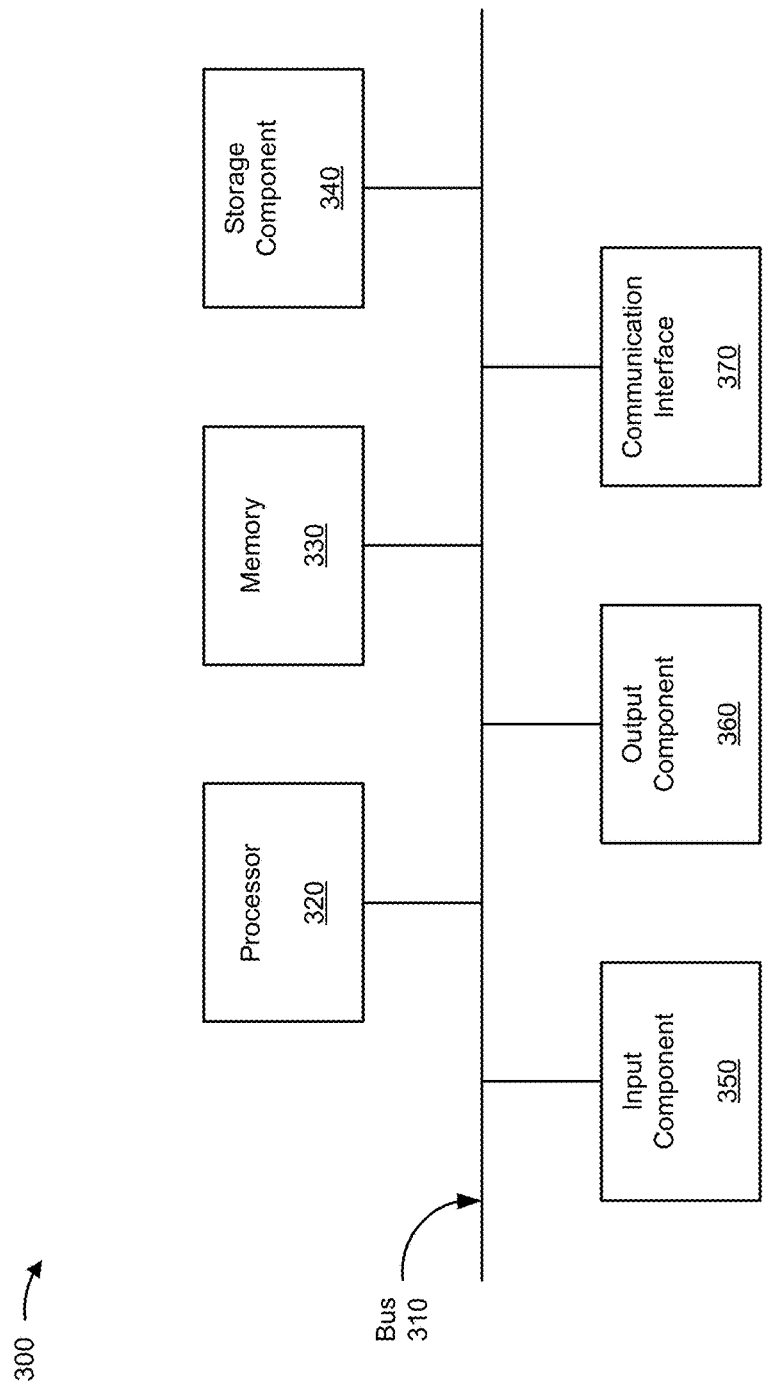
FIG. 3 is a diagram of example components of one or more devices of FIG. 2.

FIG. 3 is a diagram of example components of a device 300. Device 300 may correspond to UAV 205, base station 210, provider controller device 225, client device 235, and/or third party controller device 250. In some implementations, UAV 205, base station 210, provider controller device 225, client device 235, and/or third party controller device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
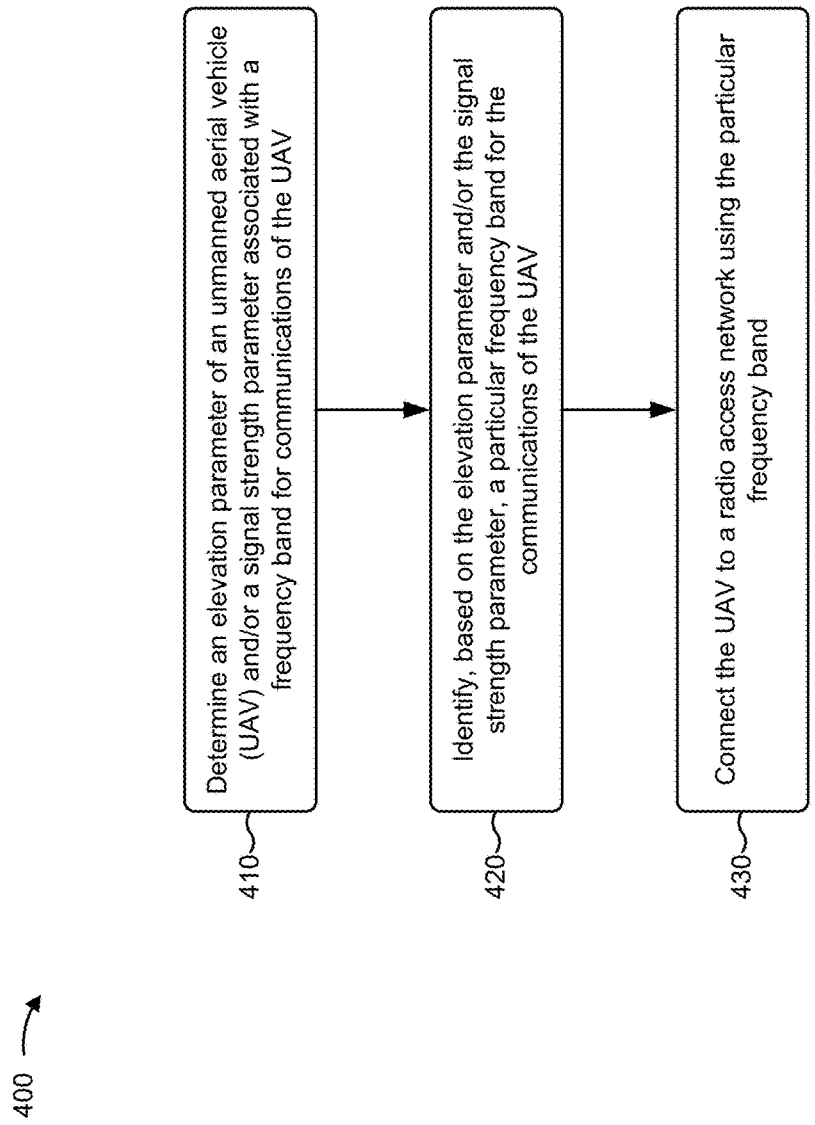
FIG. 4 is a flow chart of an example process for selecting a frequency band for communications of an unmanned aerial vehicle.

FIG. 4 is a flow chart of an example process 400 for selecting a frequency band for communications of an unmanned aerial vehicle. In some implementations, one or more process blocks of FIG. 4 may be performed by UAV 205. In some implementations, one or more process blocks of FIG. 4 may be performed by another device or a group of devices separate from or including UAV 205, such as base station 210, provider controller device 225, client device 235, and/or third party controller device 250.

As shown in FIG. 4, process 400 may include determining an elevation parameter of an unmanned aerial vehicle (UAV) and/or a signal strength parameter associated with a frequency band for communications of the UAV (block 410). For example, UAV 205 may determine an elevation parameter, that indicates an elevation of UAV 205, to identify a frequency band via which UAV 205 is to communicate with base station 210. In some implementations, base station 210 may use different frequency bands to communicate with devices at different elevations. For example, base station 210 may use one or more licensed frequency bands (e.g., one or more licensed portions of the RF spectrum band) for terrestrial communications with devices at or below a threshold elevation. In this case, antennas of base station 210 that are associated with the licensed frequency band may be pointed downward (e.g., toward the ground). As another example, base station 210 may use one or more unlicensed frequency bands (e.g., one or more unlicensed portions of the RF spectrum band) for aerial communications with devices at or above a threshold elevation. In this case, antennas of base station 210 that are associated with the unlicensed frequency band may be pointed upward (e.g., toward the sky). UAV 205 may determine an elevation of UAV 205 to identify a frequency band with which to connect to base station 210.

In some implementations, UAV 205 may determine an elevation parameter using a global positioning system (GPS) component of UAV 205, using an altimeter component of UAV 205, using a triangulation component of UAV 205, or the like. UAV 205 may determine the elevation of UAV 205, and may store an elevation parameter that indicates the elevation. Additionally, or alternatively, UAV 205 may provide location information to another device (e.g., base station 210, provider controller device 225, third party controller device 250, a mobility management entity, etc.), and the other device may determine the elevation parameter of UAV 205.

Additionally, or alternatively, UAV 205 may determine one or more signal strength parameters associated with one or more base stations 210 and/or one or more frequency bands via which the one or more base stations 210 are capable of communicating. UAV 205 may use the signal strength parameter(s) to identify a particular base station 210 with which UAV 205 is to establish a connection. Additionally, or alternatively, UAV 205 may use the signal strength parameter(s) to identify a particular frequency band via which UAV 205 is to communicate with base station 210. A particular signal strength parameter may be associated with a particular base station 210 and/or a particular frequency band.

As an example, the signal strength parameter may include a received signal strength indicator (RSSI) parameter, a reference signal received power (RSRP) parameter, a reference signal received quality (RSRQ) parameter, a signal to noise ratio (e.g., SINR) parameter, or the like.

As further shown in FIG. 4, process 400 may include identifying, based on the elevation parameter and/or the signal strength parameter, a particular frequency band for the communications of the UAV (block 420). For example, UAV 205 may identify a particular frequency band, of multiple frequency bands, and/or a particular base station 210, of multiple base stations 210, to use for communications of UAV 205. In some implementations, UAV 205 may use the signal strength parameter to identify a particular base station 210 with which to establish a connection (e.g., a base station 210 with the strongest signal strength as compared to other base stations 210). For example, UAV 205 may compare signal strength parameters for multiple base stations 210 (e.g., on one or more frequency bands), and may select a base station 210 with the best signal strength for the connection.

Additionally, or alternatively, UAV 205 may identify a particular frequency band based on the elevation of UAV 205 and/or based on the signal strength parameter. In some implementations, UAV 205 may use a data structure, a rule, a formula, etc., stored by UAV 205, to identify a frequency band based on the elevation and/or the signal strength. As an example, UAV 205 may search a data structure, using an elevation parameter that indicates the elevation of UAV 205, to identify a frequency band associated with the elevation parameter.

In some implementations, UAV 205 may select an unlicensed frequency band if the elevation satisfies a threshold (e.g., is greater than the threshold, is greater than or equal to the threshold, etc.). In some implementations, UAV 205 may select a licensed frequency band if the elevation does not satisfy the threshold (e.g., is less than the threshold, is less than or equal to the threshold, etc.). In some implementations, the threshold may be based on a height of one or more antennas of base station 210. Additionally, or alternatively, the threshold may be configured by a network operator, and may be set to, for example, 40 meters, 50 meters, 100 meters, or the like.

As another example, UAV 205 may use the signal strength parameter to identify a frequency band with which to communicate with base station 210 (e.g., a frequency band with the strongest signal strength as compared to other frequency bands). For example, UAV 205 may compare signal strength parameters for multiple frequency bands (e.g., associated with one or more base stations 210), and may select a frequency band with the best signal strength for communications.

In this way, UAV 205 may act as a user equipment (UE) when connecting to base station 210, and may utilize third generation partnership project (3GPP) standards for LTE to connect to base station 210 (e.g., by utilizing a random access procedure), thereby leveraging these standards to reduce operating costs of UAV 205, to enhance reliability of communications of UAV 205 in mobility scenarios (e.g., by utilizing a handover procedure), to share existing network architecture (e.g., base stations 210, RAN 215, core network 220, such as an EPC, etc.), to identify UAV 205 (e.g., using a universal integrated circuit card (UICC), such as a subscriber identity module (SIM)), etc.

In some implementations, UAV 205 may use both the elevation parameter and the signal strength parameter to identify the particular frequency band for communications of UAV 205. For example, UAV 205 may store a rule that identifies frequency bands associated with different combinations of elevations and signal strengths. UAV 205 may apply the rule, based on the elevation parameter and the signal strength parameter, to identify the particular frequency band.

In some implementations, UAV 205 may identify a base station 210 with which to establish a connection, and may then identify a frequency band for communications with the identified base station 210. For example, UAV 205 may compare signal strengths of multiple base stations 210 to identify a base station 210 with which to establish a connection, and may then identify a frequency band with which to communicate with the identified base station 210 based on an elevation of UAV 205 and/or based on comparing signal strengths of multiple frequency bands.

In some implementations, UAV 205 may identify a frequency band for communications, and may then identify base station 210 with which to communicate via the frequency band. For example, UAV 205 may identify a frequency band for communications based on an elevation of UAV 205 and/or based on comparing signal strengths of multiple frequency bands, and may then compare signal strengths of multiple base stations 210, on the identified frequency band, to identify a base station 210 with which to establish a connection.

As further shown in FIG. 4, process 400 may include connecting the UAV to a radio access network using the particular frequency band (block 430). For example, UAV 205 may connect to RAN 215 (e.g., via a base station 210) using the particular frequency band. As an example, UAV 205 may establish a connection with base station 210 using a licensed frequency band when UAV 205 is below a threshold elevation (e.g., based on the elevation parameter and/or the signal strength parameter). As another example, UAV 205 may establish a connection with base station 210 using an unlicensed frequency band when UAV 205 is above a threshold elevation (e.g., based on the elevation parameter and/or the signal strength parameter).

In this way, UAV 205 may utilize RAN 215 for a reliable network connection across long distances. Furthermore, interference between UAVs 205 and other devices may be reduced by utilizing the unlicensed RF spectrum band above a threshold elevation where other devices are unlikely to be located. Additionally, utilizing the unlicensed RF spectrum band may reduce an operating cost of UAVs 205 because additional spectrum will not need to be licensed to operate UAVs 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
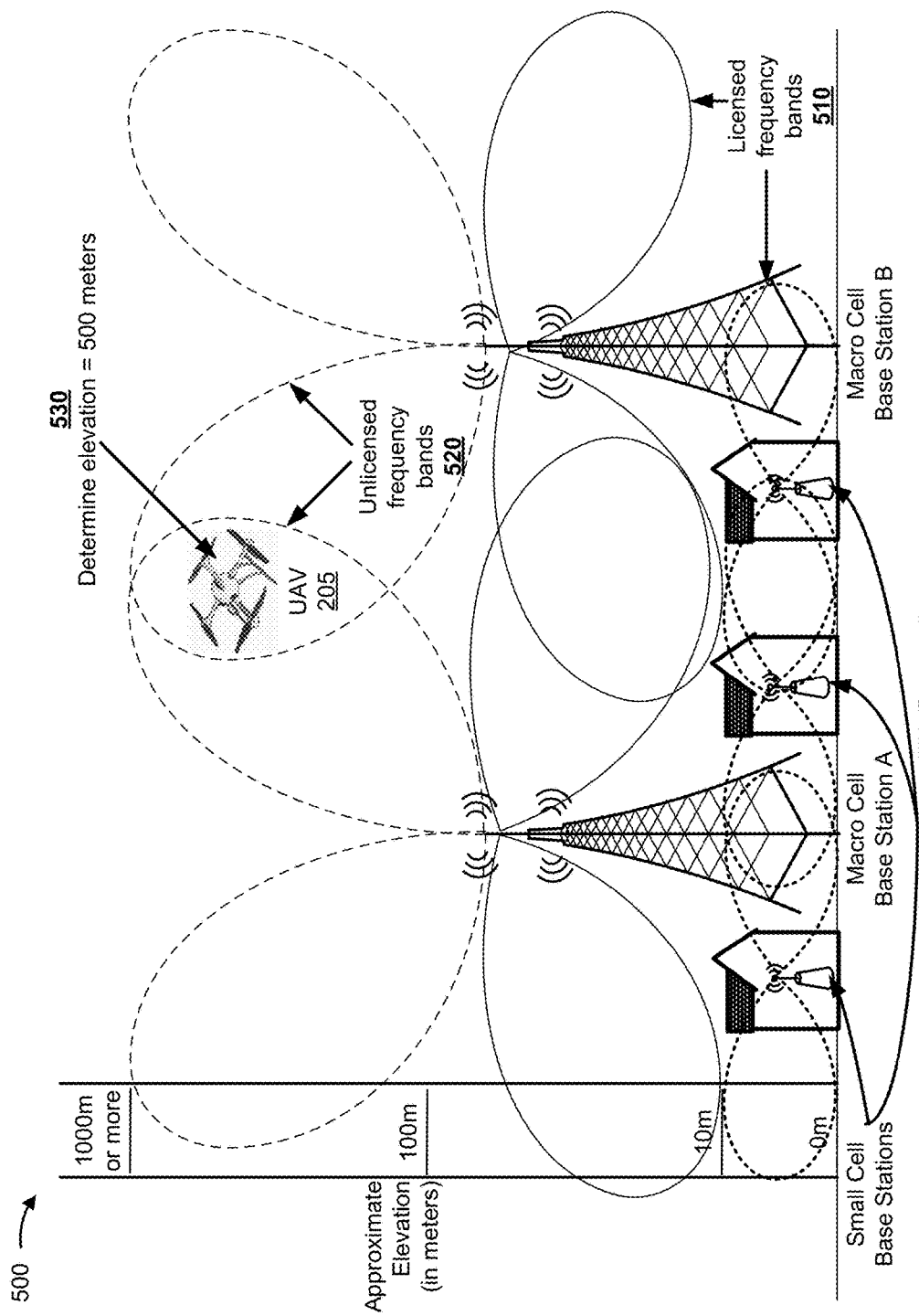
FIGS. 5A and 5B are diagrams of an example implementation relating to the example process shown in FIG. 4.
Figure 5B:
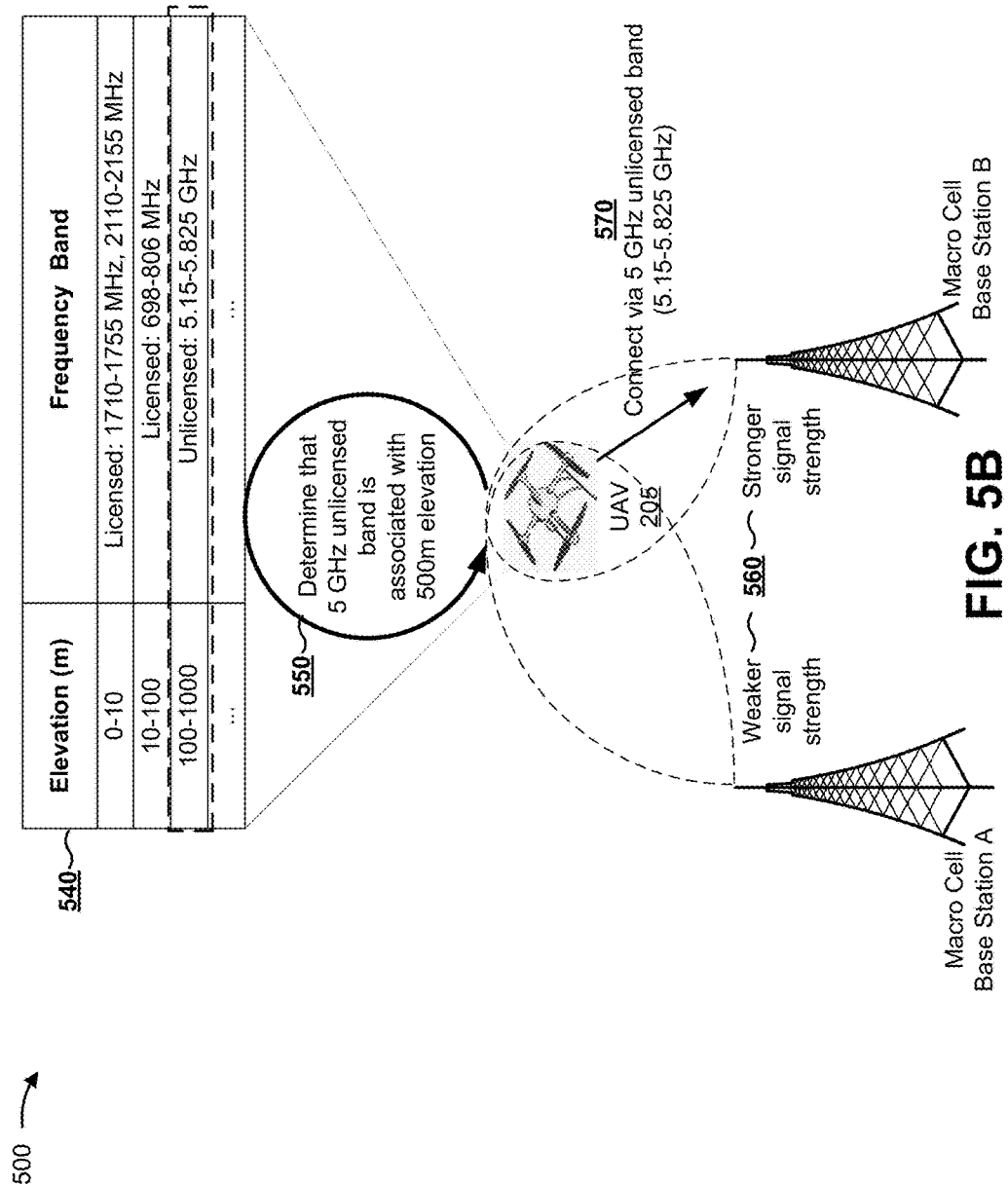

FIGS. 5A and 5B are diagrams of an example implementation 500 relating to example process 400 shown in FIG. 4. FIGS. 5A and 5B show an example of selecting a frequency band for communications of UAV 205 based on an elevation of UAV 205.

As shown in FIG. 5A, assume that RAN 215 includes multiple base stations 210, such as multiple macro cell base stations, shown as Macro Cell Base Station A and Macro Cell Base Station B, and multiple small cell base stations. As further shown, base stations 210 may communicate with other devices using a licensed frequency band 510 and/or an unlicensed frequency band 520. Assume that base stations 210 are configured to operate using licensed frequency bands 510 for terrestrial communications (e.g., communications with devices located below a threshold elevation), and are configured to operate using unlicensed frequency bands 520 for aerial communications (e.g., communications with devices located above a threshold elevation).

As shown, assume that UAV 205 is located above a threshold elevation, such as a height of an antenna of a macro cell base station (e.g., 40 meters, 50 meters, etc.). As shown by reference number 530, assume that UAV 205 determines that UAV 205 is located at an elevation of 500 meters.

As shown in FIG. 5B, and by reference number 540, assume that UAV 205 stores a data structure that indicates a relationship between different elevations and different frequency bands to be used to connect to base station 210. For example, assume that at an elevation between 0 meters and 10 meters, UAV 205 is to connect to base station 210 using a portion of the licensed RF spectrum band, such as a portion between 1710-1755 MHz or a portion between 2110-2155 MHz. Further, assume that at an elevation between 10 meters and 100 meters, UAV 205 is to connect to base station 210 using another portion of the licensed RF spectrum band, such as a portion between 698-806 MHz. Finally, assume that at an elevation between 100 meters and 1000 meters, UAV 205 is to connect to base station 210 using a portion of the unlicensed RF spectrum band, such as a portion between 5.15-5.825 GHz.

As shown by reference number 550, assume that UAV 205 uses the data structure to determine that the elevation of 500 meters corresponds to the unlicensed RF spectrum band. Based on this determination, UAV 205 determines to connect to a base station 210 using an unlicensed frequency band. As shown by reference number 560, assume that, on the unlicensed RF spectrum band, UAV 205 detects a stronger signal strength with Macro Cell Base Station B than with Macro Cell Base Station A. Thus, as shown by reference number 570, UAV 205 connects to Macro Cell Base Station B via the 5 GHz unlicensed RF spectrum band (e.g., a particular channel of the unlicensed RF spectrum band).

In this way, UAV 205 may reduce interference with other devices by connecting to base station 210 via the unlicensed RF spectrum band, which may have relatively low levels of interference at higher elevations, as compared to the amount of interference at lower elevations. Furthermore, UAV 205 may maintain a strong, reliable connection to RAN 215 as UAV 205 traverses different cells associated with different base stations 210 (e.g., by switching to different frequency bands and/or base stations 210 based on an elevation and/or signal strength associated with UAV 205).

As indicated above, FIGS. 5A and 5B are provided merely as an example. Other examples are possible and may differ from what was described with regard to FIGS. 5A and 5B.

Figure 6:
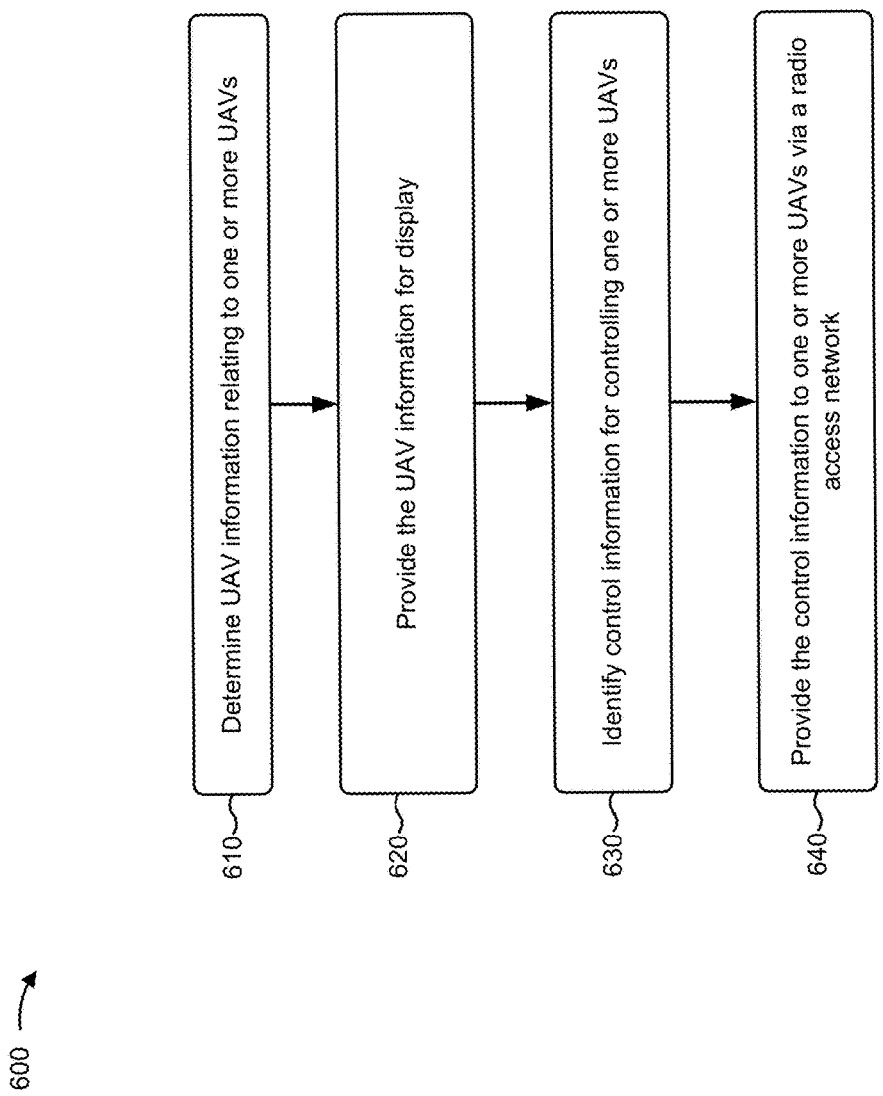
FIG. 6 is a flow chart of an example process for managing and controlling an unmanned aerial vehicle via a radio access network.

FIG. 6 is a flow chart of an example process 600 for managing and controlling an unmanned aerial vehicle via a radio access network. In some implementations, one or more process blocks of FIG. 6 may be performed by provider controller device 225 and/or third party controller device 250. In some implementations, one or more process blocks of FIG. 6 may be performed by another device or a group of devices separate from or including provider controller device 225 and/or third party controller device 250, such as UAV 205, base station 210, and/or client device 235.

As shown in FIG. 6, process 600 may include determining UAV information relating to one or more UAVs (block 610). For example, a controller device (e.g., provider controller device 225 and/or third party controller device 250) may determine UAV information. The UAV information may include information relating to one or more UAVs 205, such as identity information that identifies UAV 205 (e.g., that uniquely identifies UAV 205 to distinguish UAV 205 from other UAVs 205), location information that identifies a location of one or more UAVs 205, destination information that identifies a destination of one or more UAVs 205, route information that identifies a route of one or more UAVs 205 from the location to the destination, elevation information that identifies an elevation of one or more UAVs 205, party information that identifies a party with which UAV 205 is associated (e.g., a party responsible for managing, operating, controlling, etc. UAV 205), frequency band information that identifies a frequency band via which UAV 205 is connected to RAN 215, mission information that identifies a mission of one or more UAVs 205 (e.g., package delivery, firefighting activity, police activity, etc.), battery information that identifies a battery level of one or more UAVs 205, speed information that identifies a speed at which one or more UAVs 205 are traveling, video information recorded by one or more UAVs 205 (e.g., a video feed from a camera component of UAV 205), audio information recorded by one or more UAVs 205 (e.g., an audio feed from a microphone component of UAV 205), or the like.

In some implementations, UAV(s) 205 may determine the UAV information (e.g., based on sensing an environment of UAV(s) 205, based on UAV information stored by UAV(s) 205, etc.), and may provide the UAV information to the controller device (e.g., via RAN 215, base station 210, core network 220, etc.). Additionally, or alternatively, the controller device may store the UAV information in memory, and may obtain the UAV information from memory. Additionally, or alternatively, another device may store the UAV information, and the controller device may obtain the UAV information from the other device.

As further shown in FIG. 6, process 600 may include providing the UAV information for display (block 620). For example, the controller device may provide the UAV information. In some implementations, such as when the controller device is provider controller device 225, the controller device may provide the UAV information to client device 235, and client device 235 may provide the UAV information for display (e.g., to a user). In some implementations, such as when the controller device is third party controller device 250, the controller device may provide the UAV information for display.

In some implementations, the controller device may provide the UAV information for display via a user interface. The UAV information may include information relating to multiple UAVs 205. In this way, a user may view information relating to multiple UAVs 205, and may coordinate activities of the multiple UAVs 205 (e.g., to avoid collisions, to assist in an activity that requires multiple UAVs 205, such as firefighting, etc.).

In some implementations, the controller device may be associated with a particular party (e.g., a network operator, a third party, etc.). Additionally, or alternatively, the controller device may receive information that identifies the particular party (e.g., based on a user login that identifies the party). Additionally, or alternatively, different UAVs 205 may be associated with different parties. In this case, the controller device may obtain UAV information relating to UAVs 205 associated with the identified party, and may provide the UAV information for display. In this way, the party may manage and/or control UAVs 205 that the party owns, that the party is responsible for managing or controlling, or the like.

As further shown in FIG. 6, process 600 may include identifying control information for controlling one or more UAVs (block 630). For example, the controller device may identify control information for controlling one or more UAVs 205. In some implementations, the control information may be input by a user. For example, a user may view UAV information relating to multiple UAVs 205, may identify a problem with a UAV 205, and may input control information to resolve the problem. Additionally, or alternatively, the control information may be determined by the controller device. For example, the controller device may analyze the UAV information (e.g., using a rule, a heuristic, an algorithm, etc.) to identify a problem with one or more UAVs 205, and may identify control information to resolve the problem.

Control information may include, for example, an instruction that causes UAV 205 to perform a particular action. For example, the control information may instruct UAV 205 to modify a destination of UAV 205, to modify a route of UAV 205, to modify a mission of UAV 205, to modify an elevation of UAV 205, to modify a speed of UAV 205, or the like. As an example, the control information may be used to prevent a collision of UAV 205 with another UAV 205, with a structure (e.g., a building, a base station 210, etc.), with the ground, with another vehicle (e.g., an airplane, etc.), or the like.

As further shown in FIG. 6, process 600 may include providing the control information to one or more UAVs 205 via a radio access network (block 640). For example, the controller device (e.g., provider controller device 225, third party controller device 250, etc.) may provide the control information to UAV(s) 205. In some implementations, provider controller device 225 may provide the control information to UAV(s) 205 via core network 220, RAN 215, and/or base station 210 (e.g., via a frequency band with which UAV 205 and base station 210 communicate). In some implementations, third party controller device 250 may provide the control information to UAV(s) 205 via network 245, core network 220, RAN 215, and/or base station 210 (e.g., via a frequency band with which UAV 205 and base station 210 communicate).

The control information may cause UAV 205 to perform an action based on an instruction included in the control information, as described above. In this way, a user (e.g., a network operator, a third party, a UAV pilot, etc.) may manage and control multiple UAVs 205 for which the user is responsible. Because the control information is provided via RAN 215, UAVs 205 may reliably receive the control information, thereby improving management and control of UAVs 205. Furthermore, a user may manage an entire fleet of UAVs 205 that are located across a large geographic area (e.g., a state, a country, a region, a continent, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
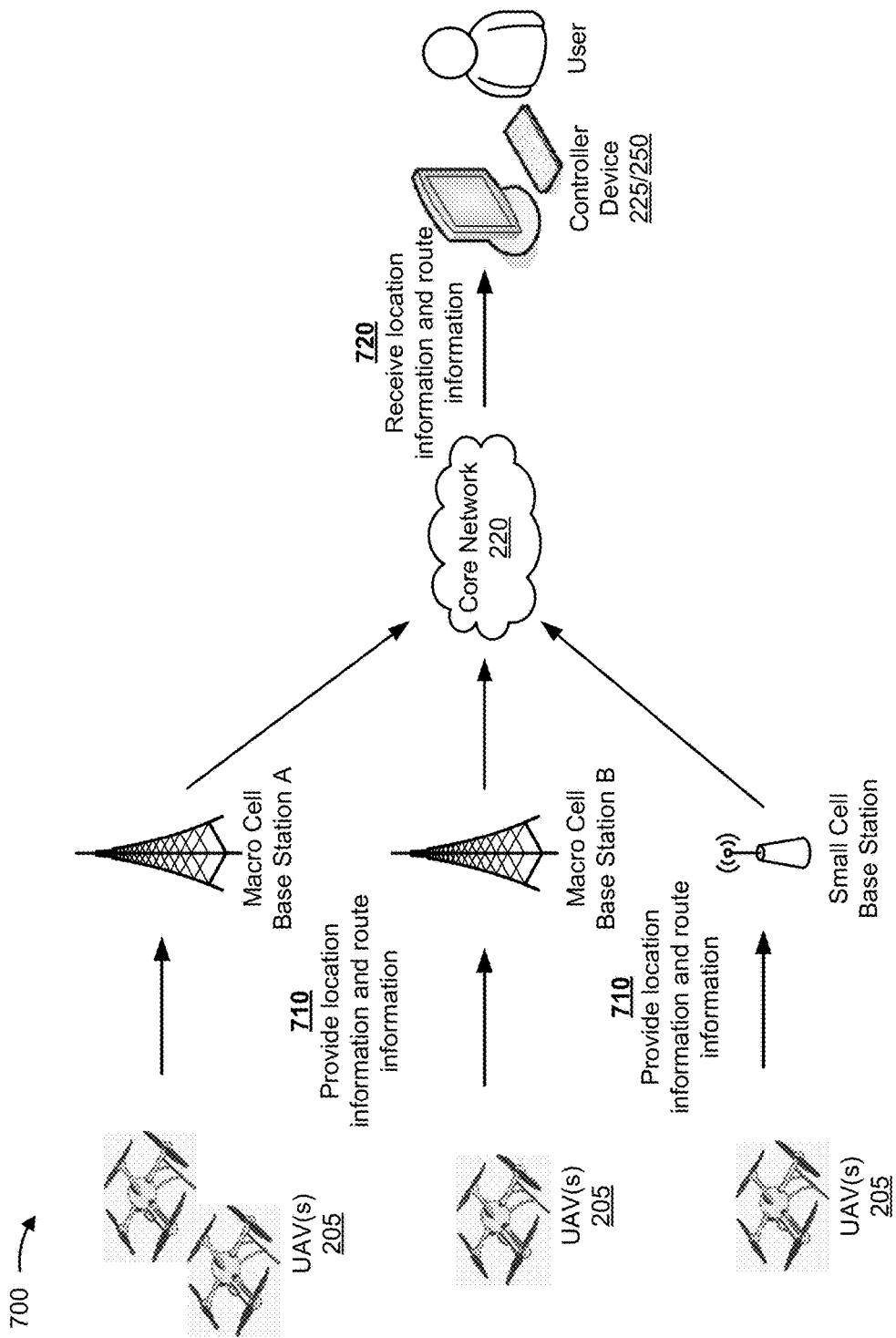
FIGS. 7A-7C are diagrams of an example implementation relating to the example process shown in FIG. 6.
Figure 7B:
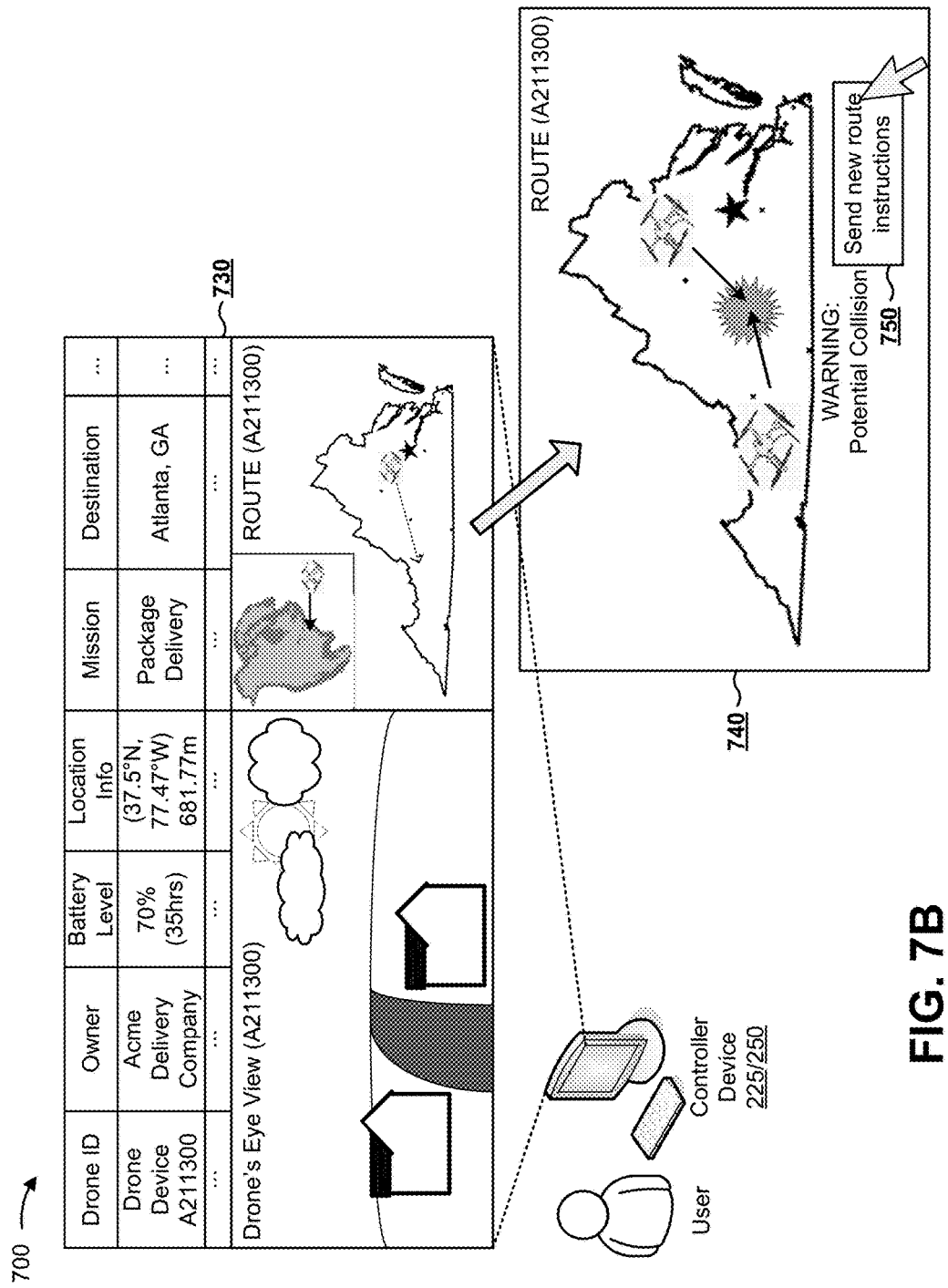
Figure 7C:
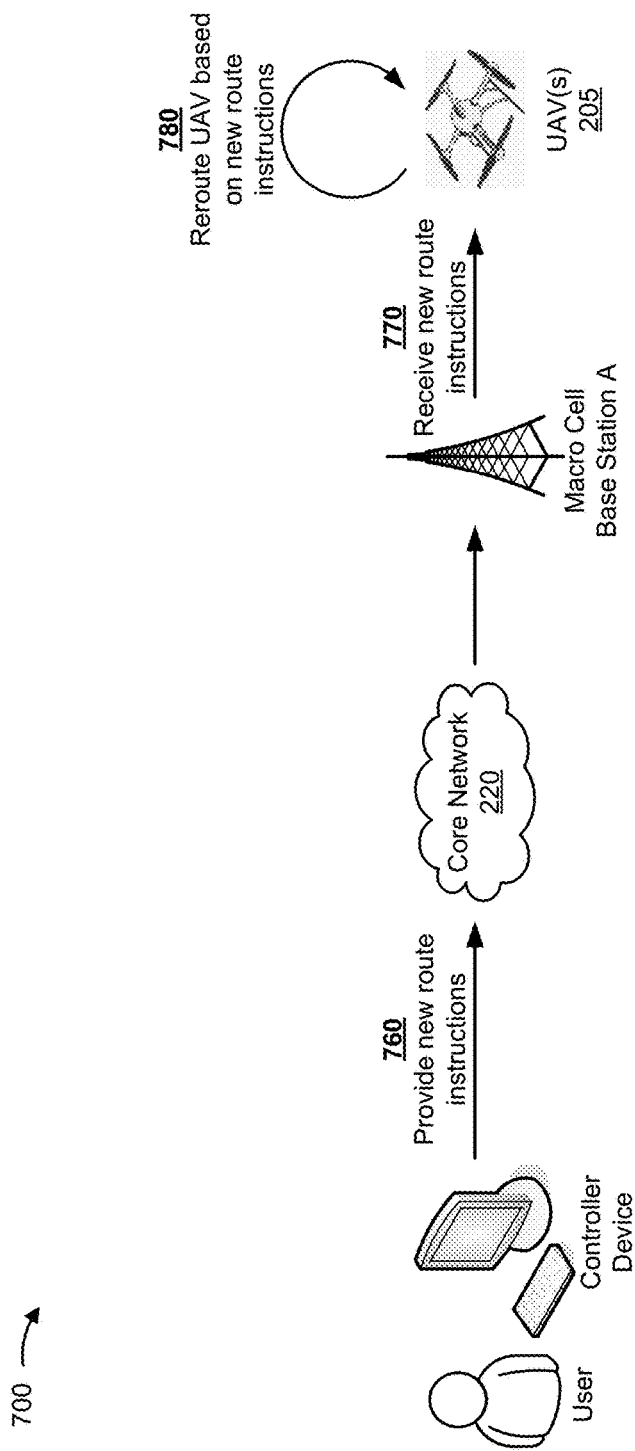

FIGS. 7A-7C are diagrams of an example implementation 700 relating to example process 600 shown in FIG. 6. FIGS. 7A-7C show an example of managing multiple UAVs 205 via a radio access network.

As shown in FIG. 7A, and by reference number 710, assume that multiple UAVs 205 provide UAV information, shown as location information and route information, via connections with one or more base stations 210 via one or more frequency bands. Further, assume that the base stations 210 provide the UAV information to a controller device (e.g., provider controller device 225 and/or third party controller device 250) via core network 220. As shown by reference number 720, assume that the controller device receives the UAV information (e.g., the location information and the route information).

As shown in FIG. 7B, and by reference number 730, assume that the controller device (e.g., and/or client device 235) provides the UAV information for display. For example, assume that the UAV information includes identity information that identifies a UAV 205, party information that identifies a party (e.g., an owner) associated with UAV 205, battery information that identifies a battery level of UAV 205, location information that identifies a location of UAV 205, mission information that identifies a mission of UAV 205, destination information that identifies a destination of UAV 205, video information that includes a video feed of UAV 205, and route information that identifies a route of UAV 205.

As shown by reference number 740, assume that the user interface provides UAV information for multiple UAVs 205. For example, the user interface may provide a map that shows a route of multiple UAVs 205. As shown, the user interface may identify a problem with UAVs 205, such as a potential collision between two UAVs 205 (e.g., based on location information, elevation information, route information, speed information, etc.). In this case, and as shown by reference number 750, the controller device may receive user input to provide control information to one or more of the UAVs 205 to modify a route and prevent the collision.

As shown in FIG. 7C, and by reference number 760, the controller device may provide the control information, that identifies a new route, to UAV 205 via core network 220 and base station 210. UAV 205 may receive the control information via base station 210 over a particular frequency band, as shown by reference number 770. UAV 205 may reroute itself based on the new route instructions included in the control information, as shown by reference number 780. For example, UAV 205 may modify a route of UAV 205, an elevation of UAV 205, a speed of UAV 205, etc. based on the instruction, to avoid a collision with another UAV 205. In this way, a user may manage and/or control multiple UAVs 205 for which the user is responsible, and may avoid problems associated with multiple UAVs 205, such as collisions.

As indicated above, FIGS. 7A-7C are provided merely as an example. Other examples are possible and may differ from what was described with regard to FIGS. 7A-7C.

Implementations described herein utilize a radio access network, such as a long term evolution (LTE) network, to permit multiple UAVs to be reliably managed and remotely controlled during flight. Furthermore, implementations described herein may utilize an unlicensed radio frequency spectrum band for communications between UAVs and base stations, thereby reducing interference with communications of other devices, and reducing costs associated with managing and controlling the UAVs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine an elevation parameter that indicates an elevation of an unmanned aerial vehicle, the elevation parameter being determined via at least one of a global positioning system (GPS) component or an altimeter component of the unmanned aerial vehicle;
identify, based on the elevation parameter, a frequency band, of a plurality of frequency bands, via which a connection is to be established between a base station and the unmanned aerial vehicle,
the frequency band being an unlicensed frequency band when:
the elevation parameter is greater than or equal to a first threshold elevation, and a macro cell base station is configured to use the unlicensed frequency band to establish the connection with the unmanned aerial vehicle when the unmanned aerial vehicle is at or above the first threshold elevation,
the frequency band being a first licensed frequency band when:
the elevation parameter is less than the first threshold elevation, and
the macro cell base station is configured to use the first licensed frequency band to establish the connection with the unmanned aerial vehicle when the unmanned aerial vehicle is below the first threshold elevation, and
the frequency band being a second licensed frequency band when:
the elevation parameter is less than a second threshold elevation, and
a small cell base station is configured to use the second licensed frequency band to establish the connection with the unmanned aerial vehicle when the unmanned aerial vehicle is below the second threshold elevation; and
establish a network connection between the unmanned aerial vehicle and a radio access network using the frequency band.

2. The device of claim 1, where the one or more processors, when identifying the frequency band based on the elevation parameter, are to:
identify the frequency band based on a signal strength parameter,
the signal strength parameter indicating a signal strength of a communication between the unmanned aerial vehicle and the macro cell base station.

3. The device of claim 1, where the one or more processors are further to:
determine a signal strength parameter,
the signal strength parameter indicating a signal strength of a communication between the unmanned aerial vehicle and the macro cell base station via the frequency band;
compare the signal strength parameter with another signal strength parameter,
the other signal strength parameter indicating another signal strength of another communication between the unmanned aerial vehicle and another base station via the frequency band; and
identify, based on comparing the signal strength parameter and the other signal strength parameter, a particular base station with which the unmanned aerial vehicle is to establish a connection; and
where the one or more processors, when establishing the network connection, are to:
establish the network connection between the unmanned aerial vehicle and the particular base station.

4. The device of claim 1, where the one or more processors are further to:
provide unmanned aerial vehicle information to a controller device via the radio access network; and
receive control information, for controlling the unmanned aerial vehicle, via the radio access network.

5. The device of claim 1, where the one or more processors are further to:
search a data structure using the elevation parameter; and
where the one or more processors, when identifying the frequency band, are to:
identify the frequency band based on searching the data structure,
the elevation parameter being associated with information that identifies the frequency band in the data structure.

6. The device of claim 1, where the one or more processors, when establishing the network connection between the unmanned aerial vehicle and the radio access network, are to:
establish the network connection between the unmanned aerial vehicle and the radio access network via the macro cell base station or the small cell base station.

7. The device of claim 1, where the first threshold elevation is based on a height of an antenna of the macro cell base station.

8. A computer-readable medium storing instructions, the instructions comprising:
one or more instructions that, when executed by one or more processors, cause the one or more processors to:
determine an elevation of an unmanned aerial vehicle via at least one of a global positioning system (GPS) component or an altimeter of the unmanned aerial vehicle;
identify, based on the elevation, a frequency band, of one or more frequency bands, via which a connection is to be established between a base station and the unmanned aerial vehicle,
the frequency band being an unlicensed frequency band when:
the elevation is greater than or equal to a first threshold elevation, and
a macro cell base station is configured to use the unlicensed frequency band to establish the connection with the unmanned aerial vehicle when the unmanned aerial vehicle is at or above the first threshold elevation, and
the frequency band being a first licensed frequency band when:
the elevation is less than the first threshold elevation, and
the macro cell base station is configured to use the first licensed frequency band to establish the connection with the unmanned aerial vehicle when the unmanned aerial vehicle is below the first threshold elevation, and
the frequency band being a second licensed frequency band when:
the elevation is less than a second threshold elevation, and
a small cell base station is configured to use the second licensed frequency band to establish the connection with the unmanned aerial vehicle when the unmanned aerial vehicle is below the second threshold elevation; and
establish the connection between the unmanned aerial vehicle and the macro cell base station or the small cell base station using the frequency band.

9. The computer-readable medium of claim 8, where the one or more instructions, when executed by the one or more processors, further cause the one or more processors to:
determine an elevation parameter that indicates the elevation; and
search a data structure using the elevation parameter; and
where the one or more instructions, that cause the one or more processors to identify the frequency band, cause the one or more processors to:
identify the frequency band based on searching the data structure,
the elevation parameter being associated with information that identifies the frequency band in the data structure.

10. The computer-readable medium of claim 8, where the one or more instructions, when executed by the one or more processors, further cause the one or more processors to:
determine an elevation parameter that indicates the elevation;
determine a plurality of signal strength parameters corresponding to a plurality of signal strengths; and
apply a rule based on the elevation parameter and the plurality of signal strength parameters; and
where the one or more instructions, that cause the one or more processors to identify the frequency band, cause the one or more processors to:
identify the frequency band based on applying the rule.

11. The computer-readable medium of claim 8, where the second threshold elevation is based on a height of an antenna of the small cell base station.

12. The computer-readable medium of claim 8, where the one or more instructions, when executed by the one or more processors, further cause the one or more processors to:
receive control information from a controller device that aggregates unmanned aerial vehicle information from a plurality of unmanned aerial vehicles,
the plurality of unmanned aerial vehicles including the unmanned aerial vehicle; and
perform an action based on the control information.

13. The computer-readable medium of claim 12, where the controller device includes at least one of:
a first controller device included in a core network associated with the macro cell base station; or
a second controller device, separate from the core network, that communicates with the core network via another network.

14. The computer-readable medium of claim 8, where the one or more instructions, that cause the one or more processors to identify the frequency band, cause the one or more processors to:
identify the frequency band based on a signal strength parameter,
the signal strength parameter indicating a signal strength of a communication between the unmanned aerial vehicle and the macro cell base station.

15. A method, comprising:
determining, by a device, an elevation parameter that identifies an elevation of an unmanned aerial vehicle,
the elevation parameter being determined via at least one of a global positioning system (GPS) component or an altimeter of the unmanned aerial vehicle;
identifying, by the device and based on the elevation parameter, a frequency band, of a plurality of frequency bands, via which a connection is to be established between a base station and the unmanned aerial vehicle,
the frequency band being an unlicensed frequency band when:
the elevation parameter is greater than or equal to a first threshold elevation, and a macro cell base station is configured to use the unlicensed frequency band to establish the connection with the unmanned aerial vehicle when the unmanned aerial vehicle is at or above the first threshold elevation,
the frequency band being a first licensed frequency band when:
the elevation parameter is less than the first threshold elevation, and
the macro cell base station is configured to use the first licensed frequency band to establish the connection with the unmanned aerial vehicle when the unmanned aerial vehicle is below the first threshold elevation, and
the frequency band being a second licensed frequency band when:
the elevation parameter is less than a second threshold elevation, and
a small cell base station is configured to use the second licensed frequency band to establish the connection with the unmanned aerial vehicle when the unmanned aerial vehicle is below the second threshold elevation; and
establishing, by the device, the connection between the unmanned aerial vehicle and a radio access network using the frequency band.

16. The method of claim 15, where the device is at least one of:
the unmanned aerial vehicle;
the macro cell base station; or
the small cell base station.

17. The method of claim 15, further comprising:
receiving control information, via the radio access network, from a controller device that aggregates unmanned aerial vehicle information from a plurality of unmanned aerial vehicles,
the plurality of unmanned aerial vehicles including the unmanned aerial vehicle; and
performing an action based on the control information.

18. The method of claim 17, where the controller device includes at least one of:
- a first controller device included in a core network associated with the macro cell base station; or
- a second controller device, separate from the core network, that communicates with the core network via another network.

19. The method of claim 15, where the first threshold elevation is based on a height of an antenna of the macro cell base station.

20. The method of claim 15, where identifying the frequency band comprises:
- identifying the frequency band based on a signal strength parameter,
  - the signal strength parameter indicating a signal strength of a communication between the unmanned aerial vehicle and the macro cell base station.

* * * * *